UNITED STATES PATENT OFFICE 2,463,471

HALOGEN-SUBSTITUTED GUANAMINES

Jack Theo Thurston, Cos Cob, Conn., assignor to American Cyanamid Company, New York, N. Y., a corporation of Maine No Drawing. Application August 30, 1941, Serial No. 409,142

8 Claims. (Cl. 260—249.5)

This invention relates to halogen-substituted guanamines.

A number of guanamines have been prepared in which the 2 carbon atom of the triazine ring is united to hydrogen or to an unsubstituted hydrocarbon radical. These guanamines have a restricted field of utility as when they are combined with formaldehyde to form a resin they have no additional reactive group. Also, in many cases, particularly when the substituent of the 2 carbon atom of the triazine ring is an unsubstituted saturated aliphatic hydrocarbon radical, the compounds can not be readily prepared by the reaction of the ester of the corresponding carboxylic acid with biguanide without the use of heat or other means which, in many cases, results in some decomposition, lowering the yield, and adversely affecting the purity of the product obtained.

According to the present invention, halogen-substituted guanamines are prepared which, by reason of the activating effects of the halogen group, can be used as intermediates to produce other guanamines, and open up a considerable additional field for guanamines and resins prepared therefrom. Also, some of the halogen-substituted guanamines of the present invention contain in their molecule highly chromophoric groups, so that they represent useful dyes, and resins made therefrom are themselves colored, the color forming a portion of the resin molecule; which in turn opens up new fields for the production of colored plastics and coating compositions.

When suitable halogen-substituted carboxylic acid esters are used, the halogen in many cases appears to activate the ester group so that reaction with biguanides may be effected without the use of condensing agents such as metal alkoxides. However, in some cases, such condensing agents are of advantage and are included, but the use of such condensing agents per se is not claimed in this application, but only in conjunction with the halogen-substituted guanamines of the present invention.

Among the most important guanamines which can be produced according to the present invention are those in which the triazine ring contains two unsubstituted amino groups. These compounds may be prepared by reacting the corresponding carboxylic acid ester with biguanide. However, the invention is not limited to the production of such compounds and, on the contrary, N-substituted guanamines may also be prepared by using the corresponding substituted biguanide, such as for example phenyl biguanide, allyl biguanide, or dimethyl biguanide.

The invention will be described in greater detail in conjunction with the following specific examples which represent typical illustrations of the present invention. The parts are by weight.

Example 1

α-Bromoisovaleroguanamine

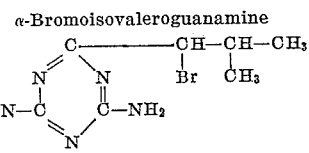

Sixty-three parts of ethyl α-bromisovalerate and 25 parts of biguanide were dissolved in 160 parts of methanol and permitted to stand. The guanamine slowly crystallized from the solvent solution and was removed by filtration and then recrystallized first from ethyl acetate, and then acetone. The yield of colorless crystals melting at 196–197° C. was about 57%.

Example 2

α,α-Dichlorostearoguanamine

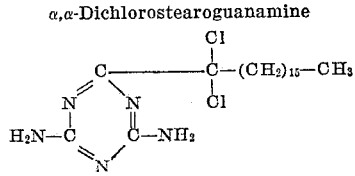

Twenty-five parts of biguanide were dissolved in 160 parts of methanol and added to 6 parts of sodium metal dissolved in 80 parts of ethanol. To this solution was added 114 parts of ethyl α,α-dichlorostearate. After some time, the guanamine precipitated and was recovered in a slightly impure form. The yield was about 41%.

Example 3

3-bromo-4-methylbenzoguanamine

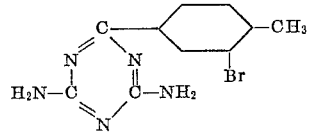

37.4 parts of biguanide were dissolved in 120 parts of methanol, the solution was filtered, and 88 parts of the methyl ester of 3-bromo-4-methylbenzoic acid added. The guanamine began to precipitate out within a few minutes and after standing overnight, the product was removed by filtration. After recrystallization from ethanol, the guanamine in the form of minute colorless needles melted at 235° C., the yield being about 71%.

Example 4

2,4,5,7-tetrabromo-6-hydroxy-9-fluoronyl-o-benzoguanamine

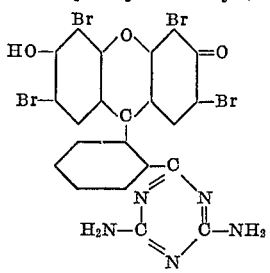

7.55 parts of biguanide were dissolved in 48 parts of methanol, the solution was filtered, and 35 parts of the ethyl ester of eosine dissolved in 240 parts of the ethyl ether of ethylene glycol added. After standing about one-half hour product began to separate from the solution and when precipitation was complete the guanamine was removed by filtration and then dissolved in boiling ethylene glycol and precipitated by dilution with dioxane. The yield of dense dark red crystals showing a green fluorescence and melting at 275° C. was about 65.5%.

When the leuco base of eosine was used instead of the ethyl ester, the yield was increased to 92.3%. The leuco base, of course, is an inner ester, or lactone.

Example 5

ω-Bromodecanoguanamine

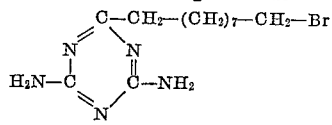

To a solution of 22 parts of biguanide dissolved in 240 parts of methanol was added 58 parts of methyl ω-bromodecanoate, which was prepared by treating ω-hydroxydecanoic acid with dry hydrogen bromide at a temperature of 140°–150° C. followed by esterification. The reaction mixture was allowed to stand overnight and the precipitated colorless product was removed by filtration. The yield of crude product was 81%. This material, melting at 143°–144° C. was not pure ω-bromodecanoguanamine but contained a small amount of ω-carbomethoxypelaragonoguanamine which was formed from the methyl sebacate present in the methyl ω-bromodecanoate.

Example 6

9,10-Dibromostearoguanamine

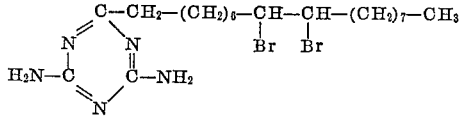

To a solution of 10 parts of biguanide dissolved in 80 parts of methanol was added 50 parts of methyl 9,10-dibromostearate dissolved in 120 parts of ethanol. After standing several days 2 parts of a crystalline solid had precipitated and was removed by filtration. This material proved to be biguanide hydrobromide. The alcohol filtrate was evaporated to a small volume and about 100 parts of acetone were added, which precipitated an additional 4 parts of biguanide hydrobromide. Since the product did not crystallize from the above volume of acetone, part of the solvent was removed and a waxy material separated on cooling. The 16 parts of light yellow solid was recrystallized three times from acetone and melted at 93–96° C. This product analyzed for 83% 9,10-dibromostearoguanamine.

What I claim is:

1. Halogen-substituted aryl guanamines having the following formula:

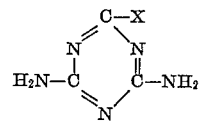

in which X is a halogen-substituted xanthene radical and the bond between X and the 2-carbon atom of the triazine ring is a carbon-to-carbon bond.

2. A method of preparing a halogen-substituted guanamine which comprises bringing about reaction between a biguanide and an ester of a halogen-substituted carboxylic acid.

3. A method of producing a halogen-substituted guanamine which comprises bringing about reaction between biguanide and an ester of a halogen-substituted carboxylic acid.

4. A method of preparing a halogen-substituted aryl guanamine which comprises bringing about reaction between a biguanide and an ester of a halogen-substituted aromatic carboxylic acid.

5. A method of producing a halogen-substituted alkyl guanamine which comprises bringing about reaction between a biguanide and an ester of a halogen-substituted aliphatic carboxylic acid.

6. A method according to claim 2 in which the reaction takes place in the presence of a lower monohydric paraffin alcohol.

7. A method according to claim 3 in which the reaction takes place in the presence of a lower monohydric paraffin alcohol.

8. Halogen-substituted alkyl guanamines having the following formula:

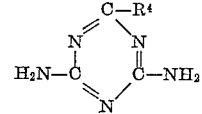

in which $R^4$ is a halogen-substituted aliphatic radical, the bond between $R^4$ and the 2-carbon atom of the triazine ring being a carbon-to-carbon bond.

JACK THEO THURSTON.

REFERENCES CITED

The following references are of record in the file of this patent:

UNITED STATES PATENTS

| Number | Name | Date |
| --- | --- | --- |
| 2,217,030 | Simons | Oct. 8, 1940 |
| 2,197,357 | Widmer | Apr. 16, 1940 |
| 2,302,162 | Zerweck | Nov. 17, 1942 |

FOREIGN PATENTS

| Number | Country | Date |
| --- | --- | --- |
| 106,398 | Switzerland | Aug. 16, 1924 |
| 449,477 | Great Britain | 1936 |
| 637,937 | Germany | 1934 |

OTHER REFERENCES

Lucas—Organic Chemistry, p. 297 (1935).
J. fur Prat. Chemie, vol. 190 (1910), p. 532.
Centralblatt, 1907 II, p. 706.
Annalen de Chemie, 376, p. 180–1.
Lowry & Harrow, 4th edition, p. XIII, Introduction to Organic Chem.
Compte Rendue, 32, pp. 62–66 (1851).
Berichte de deut. Ges. 18, pp. 2765–80.
Ind. & Eng. Chem., vol. 32, No. 9, p. 1184 (1940).